UNITED STATES PATENT OFFICE.

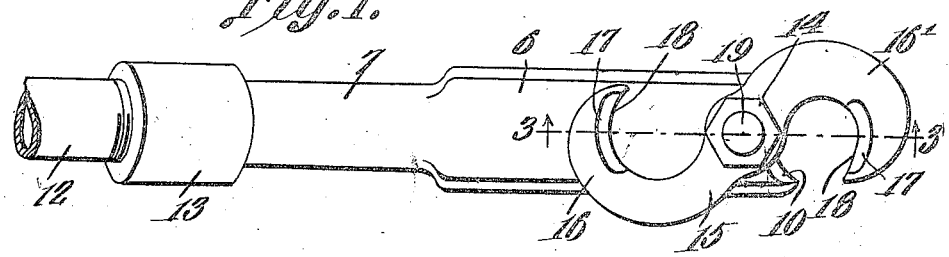

JOHN L. ANDERSON, OF OGDEN, UTAH, ASSIGNOR OF ONE-HALF TO PETER D. KLINE, OF OGDEN, UTAH.

PIPE AND CONDUIT BENDER.

1,047,480.  Specification of Letters Patent.  Patented Dec. 17, 1912.

Application filed April 13, 1912. Serial No. 690,634.

*To all whom it may concern:*

Be it known that I, JOHN L. ANDERSON, a citizen of the United States, residing at Ogden, in the county of Weber and State of Utah, have invented a new and useful Pipe and Conduit Bender, of which the following is a specification.

This invention relates to tools or implements for bending pipes, conduits, metal tubing, concrete reinforcing rods, and the like, and has for its primary object to provide a device of this character which shall be simple and light in construction, and which is portable, the same being convenient and efficient in its use.

A further object of the present invention is to provide a device of the character described applicable to pipes and conduits of various sizes, and which may be manipulated to bend pipes and conduits of various sizes in any manner.

Another object of the present invention is to provide an implement of this character which shall be substantial, durable and inexpensive in construction, which may readily be assembled and disassembled and which may be compactly stored away or placed in a tool kit or the like.

With the foregoing and other objects in view, which will be apparent as the invention is better understood, this invention resides in the novel construction and combination of parts hereinafter set forth and particularly pointed out in the appended claims, reference being had to the accompanying drawings wherein the preferred embodiment of the invention is illustrated, and wherein:—

Figure 1 is a plan view of the present tool or implement, part of the handle being broken away. Fig. 2 is an elevation thereof, parts being shown in section. Fig. 3 is an enlarged sectional detail taken on the line 3—3 of Fig. 1. Fig. 4 is a section on the line 4—4 of Fig. 2, slightly reduced in scale.

Referring specifically to the drawings, wherein similar reference characters have been employed to designate corresponding parts, the numeral 6 designates an arcuate body, which is preferably forged from steel, and which has a shank 7 projecting from one end and a pintle 11 projecting from the other end thereof, the shank 7 and pintle 11 having their respective tang 9 and the reduced portion 19 projecting therefrom. The body 6 is approximately trapezoidal in cross-section with the sides converging toward the concaved margin, and the convex side or margin of the body 6 is provided with a longitudinal groove 10, the shank 7, tang 9, pintle 11, and the reduced portion 19 being circular in cross-section.

The outer end of the shank 7 is provided with screw threads 8, and a tubular handle 12, preferably of a suitable length of pipe, has the end thereof engaged on the tang 9 and abutting against the shoulder formed by the tang 9, a coupling or sleeve 13 being in screw-threaded engagement with the adjoining ends of the handle and shank 7. In this manner, the handle 12 is attached to the shank 7 tangentially in relation to the body 6, and the tang 9 in fitting within the end of the tubular handle relieves the coupling or sleeve 13 of undue strain when force is applied to the handle 12. The joint between the handle and the shank is therefore of substantial construction and great force may be applied to the handle without affecting the joint between the handle and the shank of the body 6.

A member 15 is mounted to rotate on the pintle 11 and seats against the shoulder formed by the said pintle, and the nut 14 is screw threaded on the reduced portion 19 in order to seat against the shoulder formed by the said reduced portion and to retain the member 15 in position on the pintle. The member 15 is provided with hooks 16 and 16' on the opposite sides thereof, which hooks are of different sizes and are provided with bearing heads 17 at the bends thereof. The member 15 is preferably constructed of tool steel and the faces of the head 7 are suitably curved and are provided with ratchet teeth 18, which teeth are preferably hardened by tempering. The double hook 15 is mounted axially in relation to the body 6 and may be rotated on the pintle 11 in order to bring either of the hooks 16 and 16' thereof into coöperative relation with the convex side of the body for bending the pipe or conduit.

In the use of the implement or tool, one of the hooks 16—16' is swung into coöperative relation with the groove 10 and is engaged to the pipe or conduit which is to be bent. The body 6 is then swung against the pipe or conduit, the pipe or conduit being received by the groove 10, and the handle 12 is then swung toward the pipe or conduit. The handle in being swung toward the pipe or conduit causes that portion of the pipe between the ends of the body to be bent to form an arc equal to the arc of the body, or an arc having a greater radius than the arc of the body. The handle may then be swung away from the pipe so that the body may be slid forwardly on the pipe or away from the bent portion in order that the operation may be repeated. As shown in Figs. 1 and 2, the hook 16′ is swung into coöperative relation with the body it being apparent that the hook 16′ is adapted to engage on one side of the pipe while the body 6 is adapted to lie against the other side of the pipe.

By the proper manipulation of the implement or tool, the pipe or conduit may be bent in any manner desired, the pipe or conduit being bent on a large or small radius according to the angle at which the handle 12 is swung, and the body 6 and the hook being readily slid along the pipe to bend the pipe throughout its length as desired. The groove 10 is provided to receive the pipe or conduit in order to prevent the body 6 from slipping therefrom, and the teeth 18 are provided in order to engage or bite the pipe or conduit to prevent the implement from slipping. The head 17 also provides large bearing surfaces in order to prevent the hooks from denting or otherwise marring or injuring the pipe or conduit. The radius of the curvature of the body 6 is of a length to conform to the smallest possible radius to which the smallest size of pipe or conduit can be successfully bent, it therefore being noted that the present pipe or implement can be employed to bend pipes and conduits of various sizes at any radius to which it is possible to bend the same. It is understood, however, that this device in being constructed in different sizes to accommodate various sizes of pipes and conduits, will require that the radius of the curvature of the body 6 will be accordingly increased or diminished, which will be readily apparent to those skilled in the art. This device may be employed to bend the pipe or conduit in various manners, including reverse or compound bends, U-bends, coils, spirals and the like, and this device is also serviceable for throwing bends or offsets in pipes already in place, which is often necessary in construction work. This implement therefore provides a serviceable, convenient and efficient device of this character for bending various sizes of pipes or conduits, and without kinking or denting the pipes. The relation of the handle to the body 6 also provides for great leverage in order that the pipe or conduit may be bent with ease and despatch, this device being serviceable for a great number of requirements. The device may be readily disassembled or dismantled by detaching the handle 12 from the coupling 13 and by detaching the nut 14 which will permit the double hook 14 to be removed, and in this manner the device may be compactly stored away or carried in a tool kit or the like when not in use. The device is also simple in construction, consisting of but few parts, is substantial and durable, and is light and readily portable.

It is understood that the various parts of the implement may be constructed of various materials, such as may be desirable, and may be altered in dimensions or proportions, and that this device is otherwise susceptible of alterations or deviations in its details within the scope of the appended claims without departing from the spirit of the invention.

Having thus described the invention, what is claimed as new is:—

1. A pipe and conduit bender embodying an arcuate body, a handle attached to one end thereof and extending tangentially therefrom, and a pipe or conduit engaging hook mounted axially thereof on the other end and coöperating with the convex side of the body.

2. A pipe and conduit bender embodying an arcuate body having its convex side grooved, a member rotatably mounted on one end of the body and having a plurality of pipe or conduit engaging hooks of different sizes adapted to be swung into coöperation with the convex side of the body, and a handle attached to the other end of the body.

3. A pipe and conduit bender embodying an arcuate body having a pintle projecting from one end, a member rotatably mounted on the pintle and having a plurality of pipe or conduit engaging hooks of different sizes adapted to be swung into coöperation with the convex side of the body, and a handle attached to the other end of the body and extending tangentially therefrom.

4. A pipe and conduit bender embodying an arcuate body having its convex side grooved and having a shank and a pintle projecting from its respective ends, a handle attached to the shank, and a member rotatably mounted on the pintle and having a plurality of pipe or conduit engaging hooks of different sizes adapted to be swung into coöperation with the convex side of the body.

5. A pipe and conduit bender embodying an arcuate body, a member rotatably mounted on one end of the body and having a plurality of pipe or conduit engaging hooks of different sizes adapted to be swung into coöperation with the convex side of the body, the hooks being provided with bearing heads having their active faces curved and provided with ratchet teeth for engaging the pipe or conduit, and a handle attached to the other end of the body and projecting tangentially therefrom.

In testimony that I claim the foreging as my own, I have hereto affixed my signature in the presence of two witnesses.

JOHN L. ANDERSON.

Witnesses:
C. V. Zinn,
D. W. Eble.